US007472832B2

(12) United States Patent
Lombardi, II

(10) Patent No.: US 7,472,832 B2
(45) Date of Patent: Jan. 6, 2009

(54) SCANNING APPARATUS FOR A FORKLIFT AND METHOD FOR IDENTIFYING A PALLET LOAD

(76) Inventor: Michael A. Lombardi, II, 48-D Nanel Dr., Glastonbury, CT (US) 06033

( * ) Notice: Subject to any disclaimer, the term of this patent is extended or adjusted under 35 U.S.C. 154(b) by 8 days.

(21) Appl. No.: 11/634,722

(22) Filed: Dec. 5, 2006

(65) Prior Publication Data

US 2007/0138287 A1 Jun. 21, 2007

Related U.S. Application Data

(60) Provisional application No. 60/752,439, filed on Dec. 20, 2005.

(51) Int. Cl.
*G06K 7/10* (2006.01)

(52) U.S. Cl. ............................. 235/462.13; 235/462.4; 235/462.43; 235/383; 235/462.14; 235/462.44; 235/384; 235/385

(58) Field of Classification Search ................. 235/383, 235/384, 385, 440, 462, 462.14, 462.43, 235/462.44, 462.4
See application file for complete search history.

(56) References Cited

U.S. PATENT DOCUMENTS

| | | | | |
|---|---|---|---|---|
| 4,706,772 | A * | 11/1987 | Dawson et al. | 180/167 |
| 5,331,580 | A * | 7/1994 | Miller et al. | 708/173 |
| 5,517,434 | A * | 5/1996 | Hanson et al. | 361/683 |
| 6,669,089 | B2 * | 12/2003 | Cybulski et al. | 235/385 |
| 7,121,457 | B2 * | 10/2006 | Michal, III | 235/375 |
| 7,155,304 | B1 * | 12/2006 | Charych | 700/214 |
| 2005/0040231 | A1 * | 2/2005 | Allison et al. | 235/385 |
| 2006/0220872 | A1 * | 10/2006 | Brown et al. | 340/572.7 |

* cited by examiner

*Primary Examiner*—Uyen-Chau N Le
*Assistant Examiner*—Tuyen K Vo
(74) *Attorney, Agent, or Firm*—Alix, Yale & Ristas, LLP

(57) ABSTRACT

A scanning device and an identification system that enable the operator of a materials-handling vehicle to identify and track goods by scanning labels or other identifying information from a remote location without having to leave the forklift. The device may optionally be used in conjunction with a motion sensor and a monitor.

10 Claims, 15 Drawing Sheets

28

SCANNING APPARATUS FOR A FORKLIFT AND METHOD FOR IDENTIFYING A PALLET LOAD

CROSS REFERENCE TO RELATED APPLICATIONS

This application claims priority under 35 U.S.C. § 119(e) based on provisional application No. 60/752,439, filed Dec. 20, 2005.

FIELD OF THE INVENTION

The present invention relates generally to a system for aiding a forklift operator in retrieving objects that are stored overhead or in locations where the operator is unable to confirm the contents or other identifying information via visual inspection or with a handheld scanner.

BACKGROUND OF THE INVENTION

In the warehouse and shipping industries, motorized forklifts are the principal means of lifting, stacking, moving, and retrieving heavy loads. In large warehouses and similar facilities a large proportion of these loads are placed and stored on pallets. The pallets are then arranged on high vertical storage racks. This system of storage is not conducive to visually identifying and retrieving specific goods or pallets, especially without moving the pallets closer to or onto the ground. For example, illegible or lost label information, poor lighting, visual obstructions, and human error make visual inspection/identification of pallets and other stored materials unreliable and impractical. The fact that there is not a uniform place for labeling pallets further complicates the process of identifying, tracking, and retrieving goods. For instance, labels are often placed in a spot that is not scannable once a pallet is in the forks because the load rest often blocks the label. On larger pallets, the label may be placed higher on the stack of goods so that the load rest will not obstruct the label. However, once that layer of product is removed from the pallet, the information, which pertains to the remainder of the pallet, is lost.

Other labeling arrangements require the forklift operator to first turn the forklift at a right angle to the pallet to access the label, after which the forklift must be redirected in order to engage the load and take it to its destination. In other circumstances, the operator must dismount his lift to use a hand scanner or other device to identify the goods. Because labels cannot be read before bringing the pallet to the ground, there is no way of knowing whether the wrong pallet was retrieved until the label is read by hand.

Finally, once a pallet has been placed in a particular location on the storage racks its location must be confirmed. However, high level locations, such as the $7^{th}$ level storage rack and higher, are impractical to scan because most handheld scanners cannot scan that high. In other words, it is difficult to know the exact location (i.e. the exact slot) of materials placed in high level racks for storage. Instead of scanning the labels on high level storage racks, the labels on low level materials stored on the $1^{st}$ or $2^{nd}$ level slots are scanned to confirm the higher level put-aways. For example, the limitations of common scanning devices require that a pallet that is actually put away in a $6^{th}$, $7^{th}$, or $8^{th}$ level slot is likely confirmed as being stored in a lower level slot. Thus, it is easy to see how this system generates errors and inventory problems.

Currently, when a pallet is pulled from the storage racks, it is taken down without any confirmation that the pallet is in fact the correct one for removal. Instead the pallet is picked up, pulled in, and then dropped to a height where the label is visible or scannable. If the label is not visible the operator must extend his forks, drop the pallet to the ground, back-up out of the pallet until the label is visible, scan the label and confirm its destination. If the wrong pallet was removed, it must be returned and the selection process must be repeated until the correct pallet is located.

Accordingly, there exists a need for a system for material handling vehicles that would allow an operator to detect, identify, retrieve, and relocate goods with greater precision, accuracy, and efficiency.

SUMMARY OF THE INVENTION

The present invention, in a preferred form, is directed to a scanning device mounted in the open space between the load rest bars and protected by a metal plate. The scanner is mounted to a mounting bracket. This bracket can be made out of metal or other durable material. The scanner detects and scans the labeling information on pallets, products on the pallets, and/or labeling information on storage racks. According to one embodiment, the scanner is used in conjunction with a motion detector or similar device so as to allow for automatic activation of the scanner. In another embodiment, the motion detection device is absent and the sensor unit is turned on and off manually using a switch, toggle or similar device which may be remote from the scanner.

An object of the present invention is to provide a system for identifying, tracking, and relocating pallets or individual objects with greater reliability and cost efficiency than known systems.

Another object of the invention is to provide a system for identifying, tracking, and relocating pallets or individual objects that also enables the operator to properly align the material handling unit to manipulate the pallet or object.

A further object of the invention is to provide a system for identifying, tracking, and relocating goods that is used in conjunction with a labeling system such as RFID or bar codes.

A better understanding of the invention will be obtained from the following detailed description of the presently preferred, albeit illustrative, embodiments of the invention.

BRIEF DESCRIPTION OF THE DRAWINGS

Referring now to the drawings wherein like elements are numbered alike in the several Figures.

DETAILED DESCRIPTION OF THE PREFERRED EMBODIMENT

With reference to the drawings, wherein like numerals represent like components throughout the several views, the present invention relates to the use and positioning of a scanning module designated generally by the number 10 and has particular applicability in large warehouse and/or distribution center settings. The scanning module 10 is mounted to a materials-handling vehicle and enables the operator of the materials-handling vehicle to identify loads and/or the location of loads by scanning a bar code label or other means of representing identifying information. The identification is made from a remote location without requiring the operator to exit the forklift or materials-handling vehicle. In one embodiment, the scanning module 10 employs a laser reader. In another embodiment, the scanning module may be used in conjunction with a motion sensor device. Generally, the information scanned by the scanning module 10 is transmitted and viewed by the operator on a monitor to confirm the identification and/or the location of the scanned load. In a preferred embodiment, the identification and/or location data is stored for later viewing and/or printing.

Figure 1:
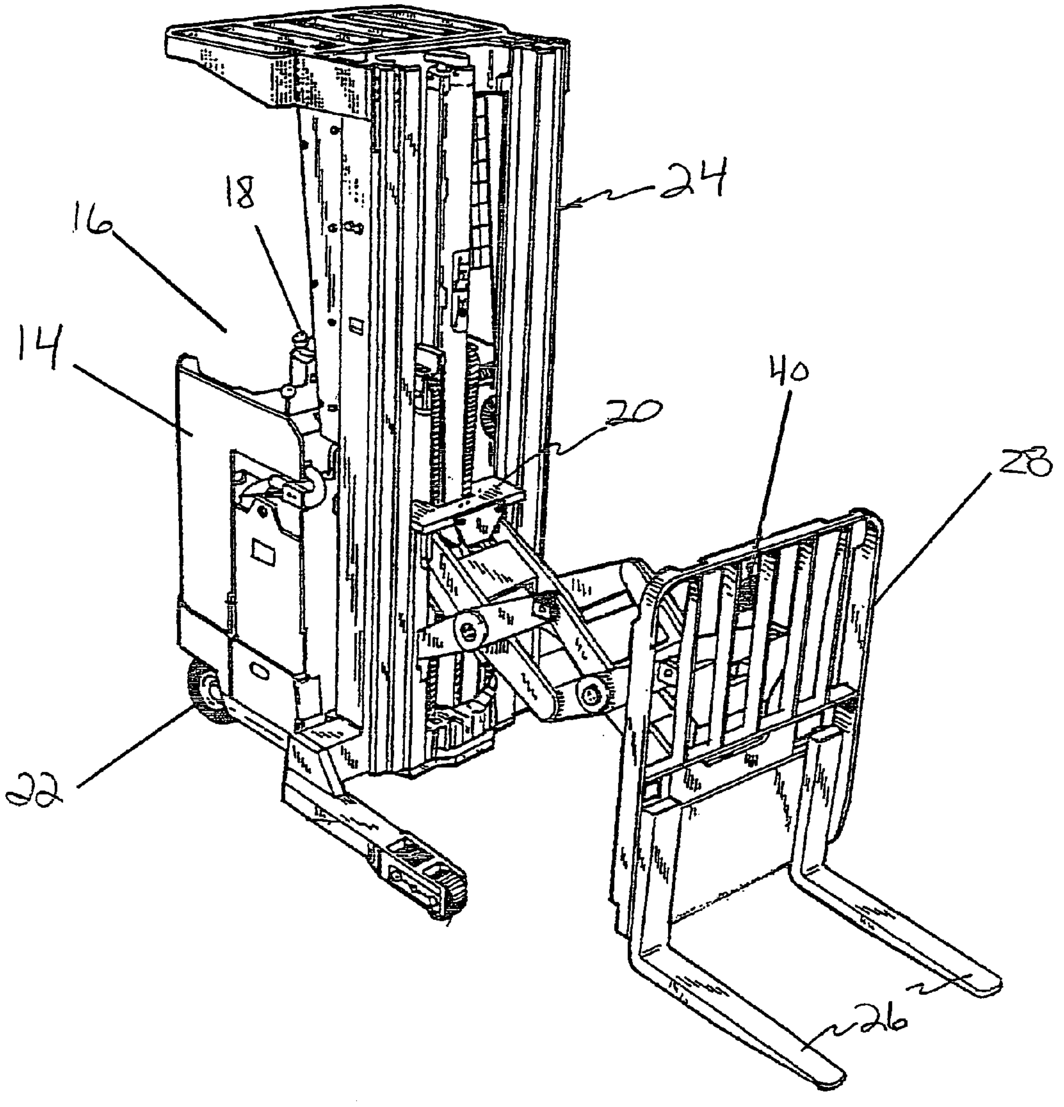
FIG. 1 is a perspective view of a representative forklift.

The scanning module and identification method preferably can be used with all typical material-handling vehicles such as lift trucks, rider-reach vehicles, or three- or four-wheel counterbalanced trucks or similar machines that are equipped with a vertically displaceable load rest. As shown in FIG. 1, a forklift is a representative material-handling vehicle that may be used in conjunction with the scanning modules and identification methods described herein. Generally, a material-handling vehicle includes a frame 14 having an operator's compartment 16, a drive mechanism 18 supported on the frame, and a vertically displaceable carriage 20 coupled to the frame. The vertically displaceable carriage 20 generally includes a pair of forks 26 mounted to a load backrest 28. The drive mechanism may include an electric motor that drives one or more wheels 22. The materials-handling vehicle may also be equipped with a telescoping, mast assembly 24 or similar mechanism that facilitates and supports the vertical movement (telescoping) of the carriage 20.

In large warehouses and/or distribution facilities, loads 30 are generally stored and transported on pallets 31. The pallets 31 have channels 32 to accommodate each of the forks 26. To "engage a load," the vehicle operator must first align the forks 26 with the channels 32 and then direct the vehicle forward causing the forks to enter or engage the pallet 31. Once the load is fully engaged, the operator is then free to manipulate the load as necessary. Vehicles such as forklifts typically have a vertical displacement range of between 10 to 60 feet which facilitates the manipulation of loads on upper levels of pallet/rack system storage systems found in large warehouse and/or distribution facilities.

Figure 2:
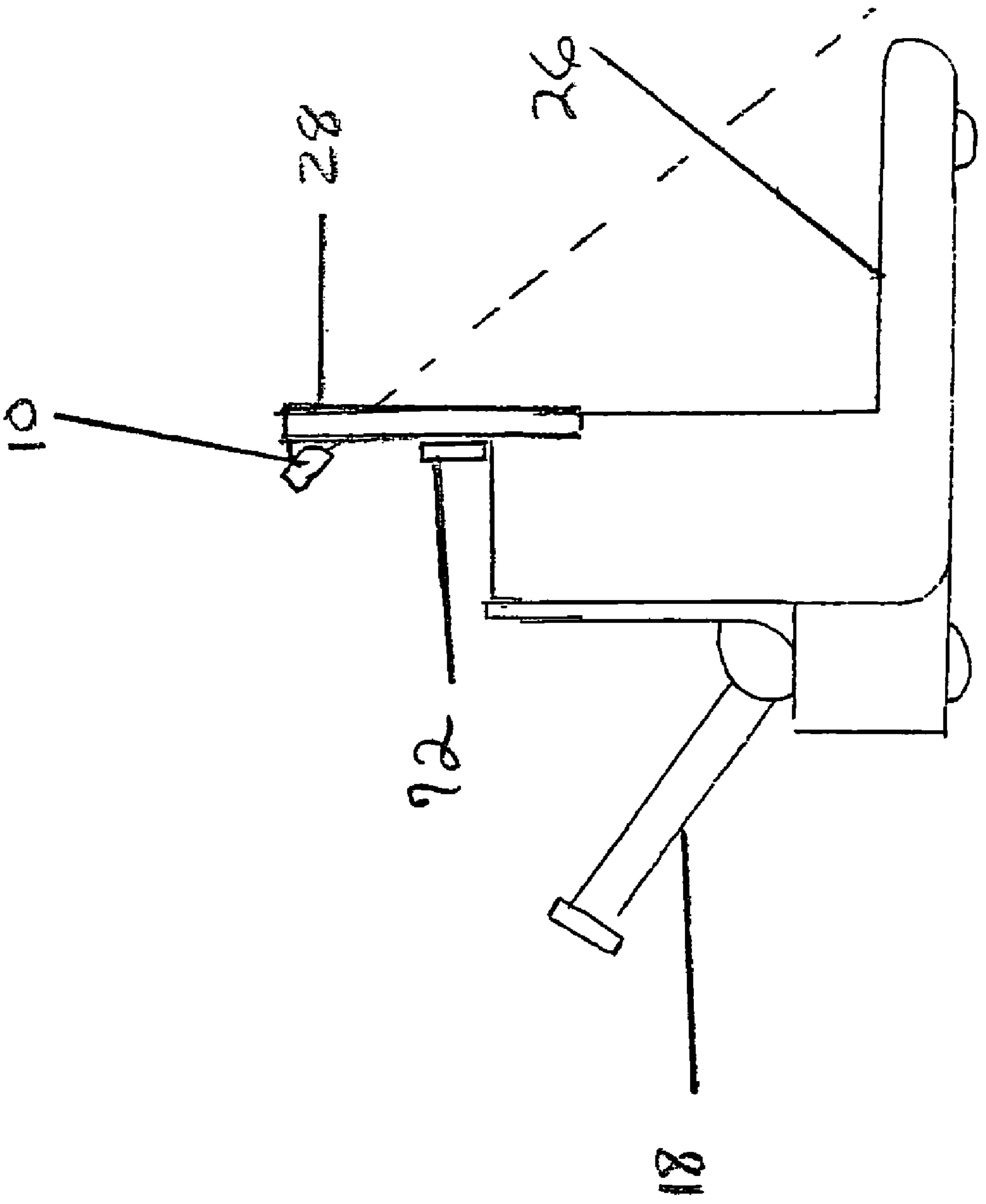
FIG. 2 is a side view of a representative single pallet jack, partly in schematic form, used in conjunction with an embodiment of a scanner module and a monitor.

Alternatively, the scanning module and identification method may be used with material-handling vehicles that have a limited vertical displacement (telescoping) capability, such as single pallet jacks. A representative single pallet jack is shown in FIG. 2. Due to their more limited capacity for the vertical displacement of loads, single pallet jacks are commonly used to load and unload larger vehicles, such as trucks, as opposed to positioning loads in high-level storage systems.

Figure 3B:
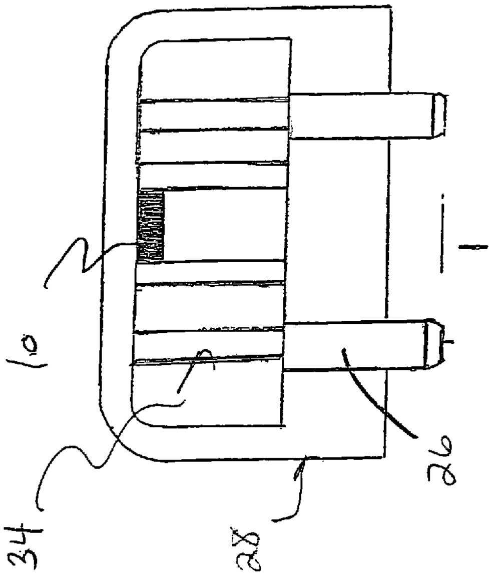
FIG. 3B is a forward view of the device illustrated in FIG. 3A.
Figure 3A:
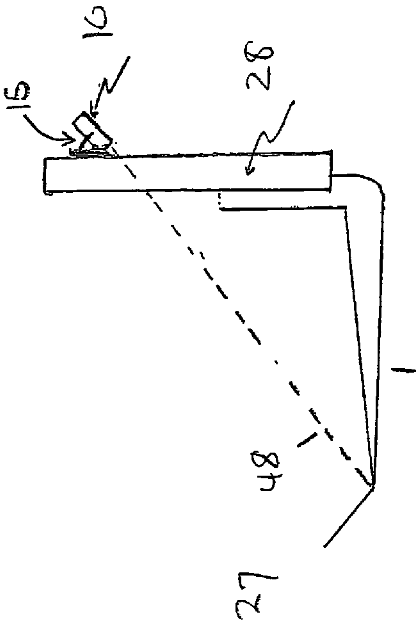
FIG. 3A is a side view, mostly in diagrammatic form, of the scanner module illustrated in FIG. 2.
Figure 3C:
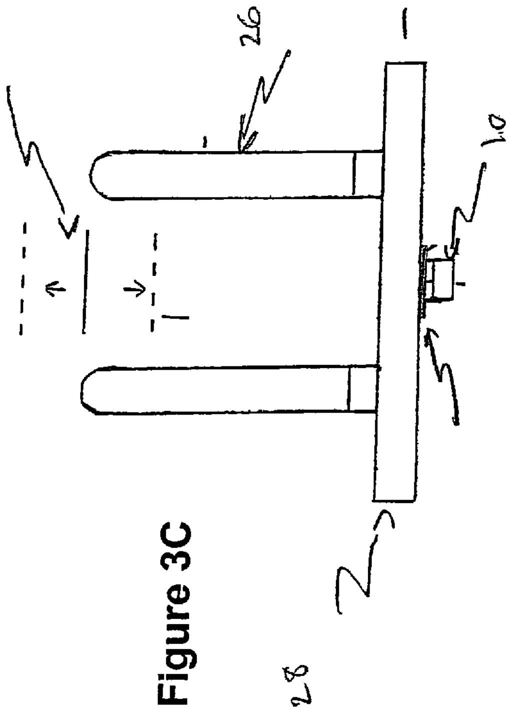
FIG. 3C is an overhead view, partly in schematic and partly in diagrammatic form, of an embodiment of the device illustrated in FIG. 3A.

As seen in FIGS. 3A-3C, the scanning module 10 is typically mounted in the open space between the load-rest bars 34. The scanning module 10 is attached to the vehicle via mounting assembly 15. For vehicles such as forklifts, mounting the module 10 in this location will permit the scanning of upper level storage racks as well as upon pallet entry at ground level. For vehicles with a more limited range of vertical displacement, such as single pallet jacks, mounting the scanning module 10 in this location will allow for scanning of data on the pallet or on the load itself as the vehicle enters the pallet 31.

Figure 4:
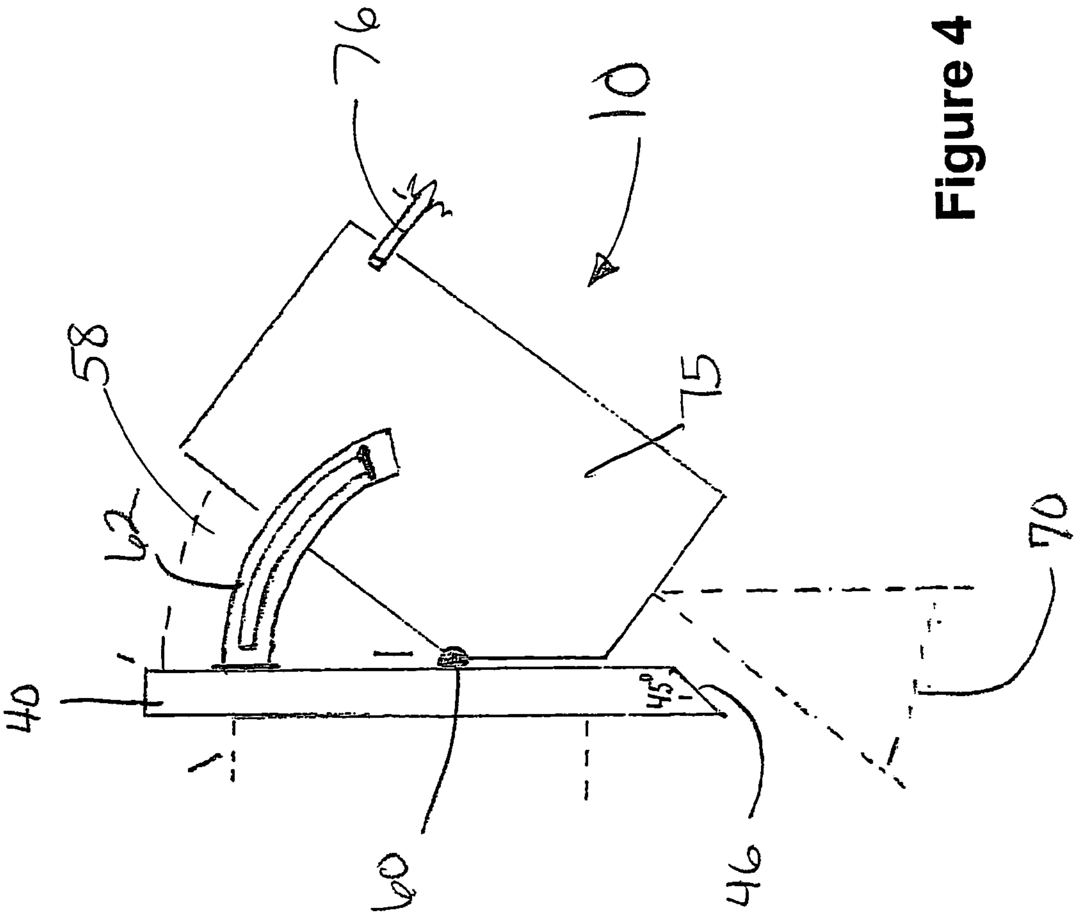
FIG. 4 is a side view, partly in schematic and partly in diagrammatic form, of one embodiment of a scanner module without a motion sensor.
Figure 5B:
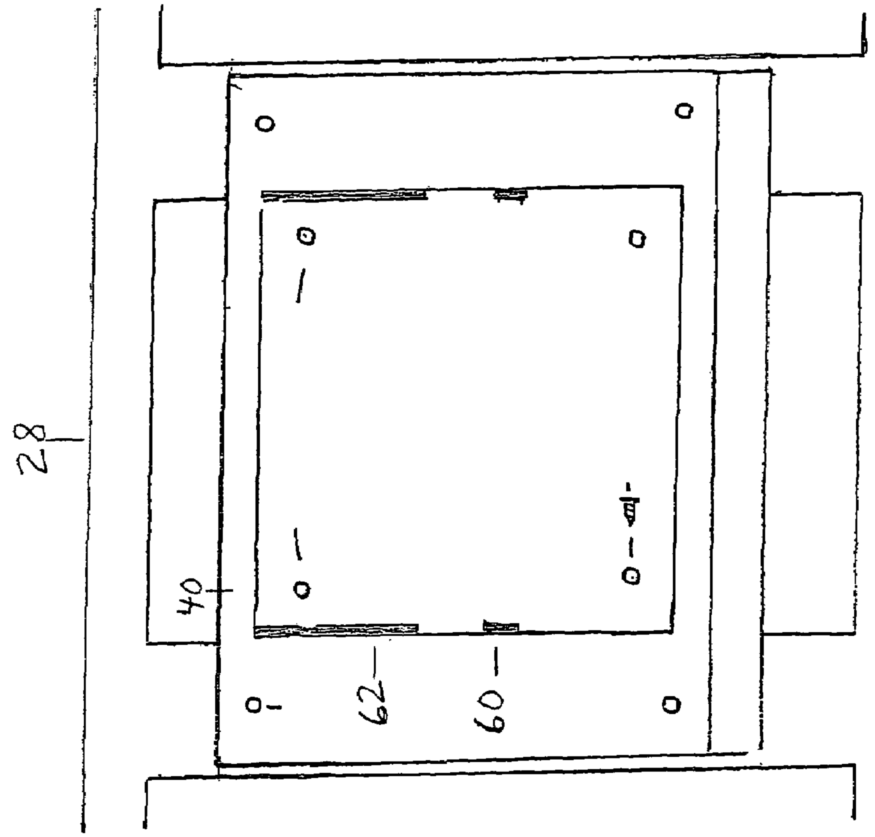
FIGS. 5A and 5B are a side view and a forward view, respectively, partly in diagrammatic form, of an embodiment of a portion of the mounting apparatus for the protective plate.
Figure 5A:
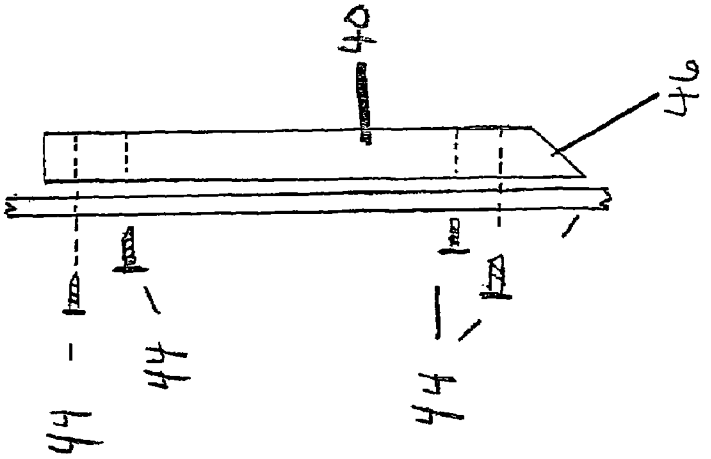

A representative mounting assembly 15 for a scanner module 10 is illustrated in FIG. 4. Mounting assembly 15 generally includes a plate 40, scanner body 75, mounting brackets 62 and a pivoting pin 60. Preferably, the plate 40 protects the scanning module 10 from damage by the load being manipulated during the operation of the material-handling vehicle. In one embodiment, the plate 40 is comprised of steel but alternatively the plate can be comprised of plastic or other durable material. The plate 40 can either be mounted to the vehicle via fasteners. Alternatively, the plate 40 can be welded in place. Different material-handling vehicles may require different plate sizes and/or mounting accommodations. In one embodiment, illustrated in FIG. 5A, the plate 40 is attached to the vehicle via a plurality of fasteners 44. The plate 40 is preferably configured as having an angle 46 on at least one end. The angle 46 ensures that the plate 40 does not obstruct the operation of the scanning module 10 while protecting the scanner from damage during load manipulation. In one preferred embodiment, the angle 46 is about 45 degrees.

The scanner body 75 is mounted to the plate 40 at a mounting angle 58. The mounting angle 58 establishes the sweep or scan path 38 that passes over and/or intersects the identification and/or location data to be scanned. The scan path 38 also depends on the scanning angle 70. The mounting angle 58 can be adjusted via pivoting pin 60 and fixed by brackets 62. Adjustments to the mounting angle 58 changes the scanning angle 70. Typically, the mounting angle 58 and the scanning angle 70 are such that the scan path 38 is aligned with and in-between the tips 25 of the forks 26. It is preferred that the scan path 38 intersects the identification and/or location data as the material-handling vehicle enters and/or exits a pallet 31. In one embodiment, the identification and/or location data is represented by a bar code or similar tracking label system which is preferably affixed to the pallet and/or load in a location that intersects the scan path 38 as the material-handling vehicle approaches the pallet 31. In another embodiment, the scan path 38 enables the operator to use the scanning module 10 as a guide for aligning the material-handling vehicle in preparation for engaging a load. Preferably, the scanning module 10 may emit a visible line 48 along the scan path 38 which helps the operator align the vehicle with the channels 32 before engaging the load. The visible line 48 can be seen on the pallet as the material-handling vehicle approaches a load and thus acts as a visual guide for the operator. One example of a suitable scanner is Symbol LS 3478 ER.

Figure 6C:
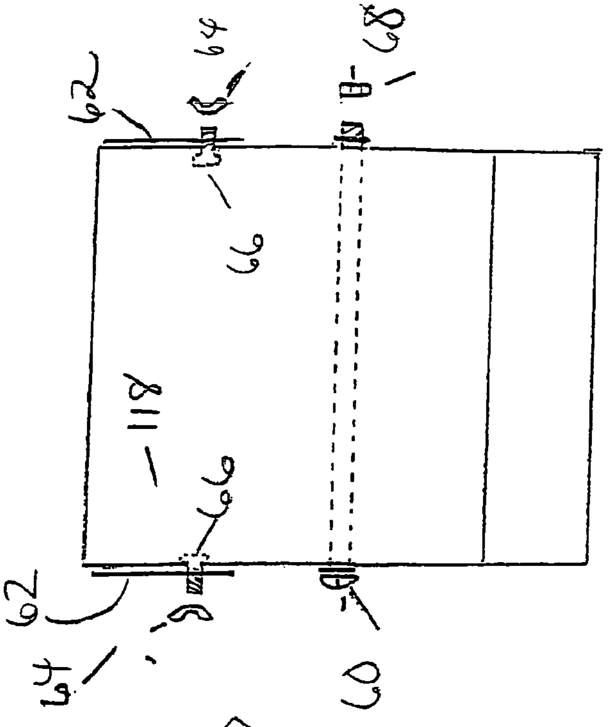
FIGS. 6A, 6B and 6C are respectively a side view, a partial side view and a forward view, partly in diagrammatic form, of an embodiment of a mounting apparatus for the device illustrated in FIG. 4.
Figure 6B:
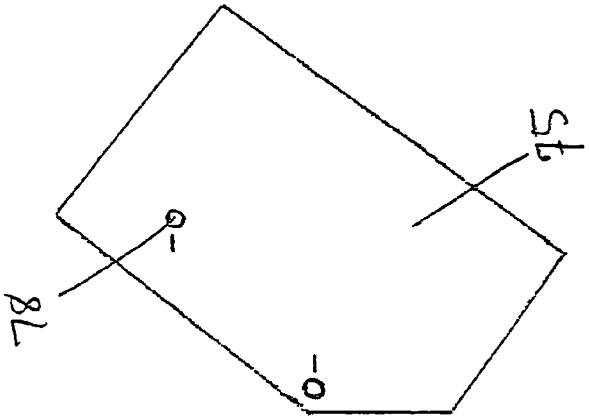
Figure 6A:
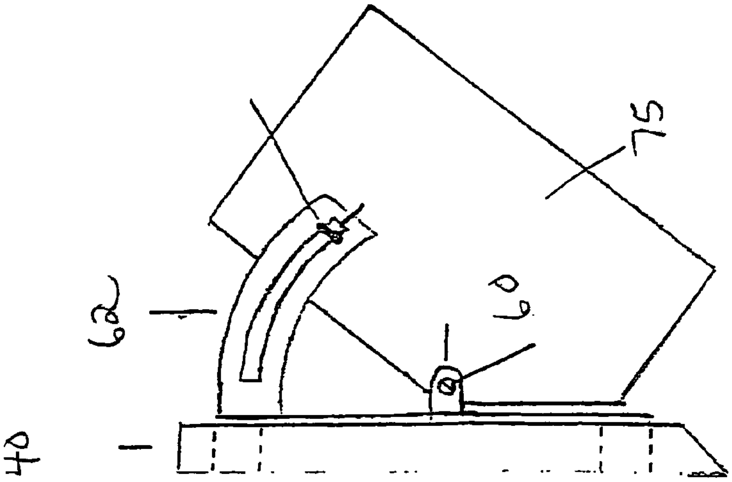

As shown in FIGS. 6A-C, brackets 62 are each secured to the scanner body 75 by at least one wingnut 64 and bolt 66. Pivot pin 60 is secured via nut 68. The wiring path for the scanner module 10 will preferably follow the same path used to wire the controls for the fork tilt and the extension mechanism. Most material-handling vehicles typically have these controls mounted on the carriage. In one embodiment, the scanning module 10 has a hard-wired connection 76 to a monitor 72 mounted on or in the material-handling vehicle. Preferably, the monitor 72 will visually display the identification and location information scanned during load manipulation operations. In another embodiment, the scanning module may use wireless technology to transmit the scanned data to the monitor 72 or similar device, such as a handheld computer.

Figure 7:
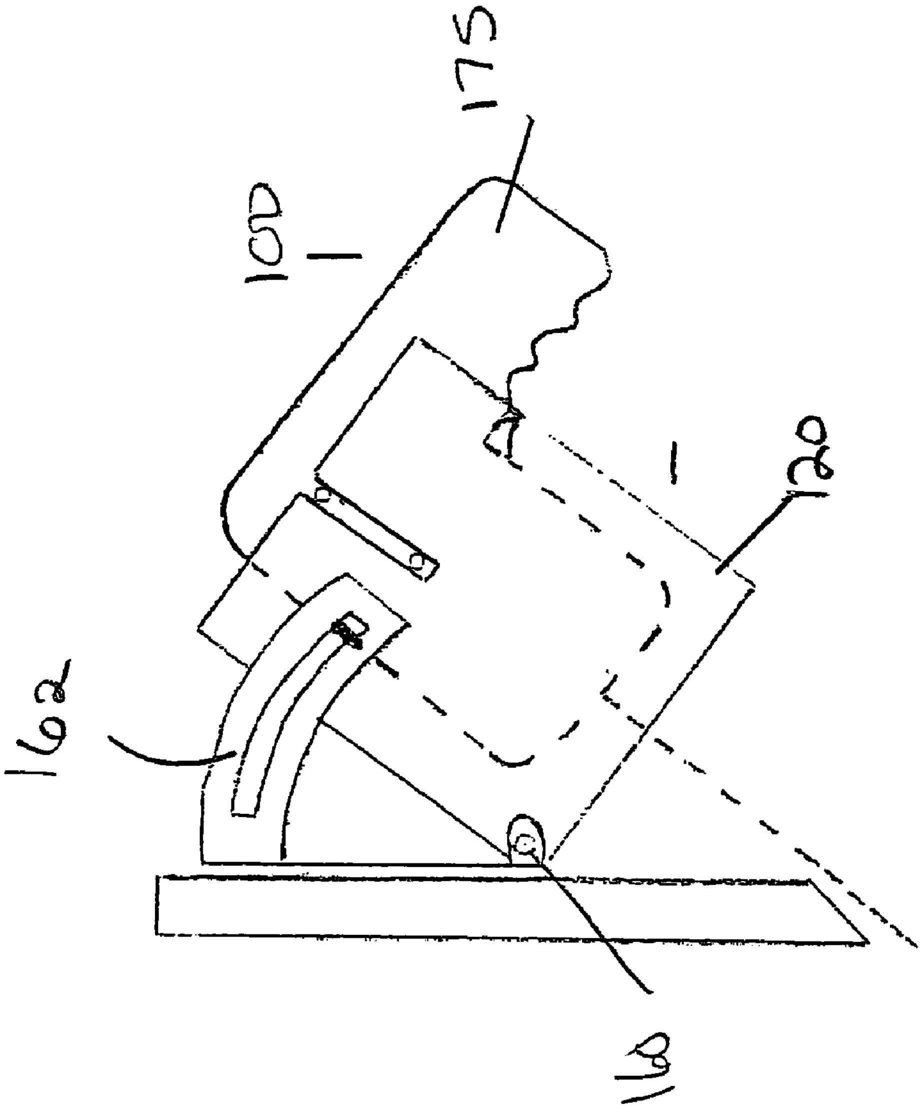
FIG. 7 is a side view, partly in diagrammatic form, of another embodiment of a scanning module, including a detachable, hand-held scanner body.

In another embodiment, illustrated in FIG. 7, the scanning module 100 is configured as a detachable hand-held scanner body 175. The scanner body 175 is not mounted directly to the vehicle via plate 40, but instead scanner body 175 rests in a holster 120. Holster 120 is mounted to a bracket 62 as described above. The holster 120 has a mounting angle 158 and a scanning angle 170 that can be adjusted via pivot pin 160. The holster 120 will preferably have a lock and release mechanism to keep the scanner body 175 secure in the holster 120 while the vehicle is in motion and/or not in use. Scanning module 100 can be used in conjunction with telescoping and non-telescoping material handling vehicles. For example, when scanning module 100 is used with non-telescoping material-handling vehicles, the hand-held scanner body 175 may be readily detached by the operator to verify every pallet and/or load that is handled. However, scanner module 100 can be used with telescoping vehicles if desired. In another embodiment, scanner module 100 provides a portable scanner body 175 that may be "shared" among a number of different material-handling vehicles that are each equipped with a holster 120. This embodiment offers a lower cost scanner and identification system that may particularly benefit smaller scale storage and/or distribution facilities where only a few material-handling vehicles are in use at any one time. It should be understood that the individual features or the combination of features does not limit the handheld scanner body. For example, the handheld scanner body may have a rechargeable battery or be energized by a power source mounted in or on the material-handling vehicle. Similarly, the handheld scanner body may employ wireless technology or a hard-wired connection for the transmission of data.

Figure 8:
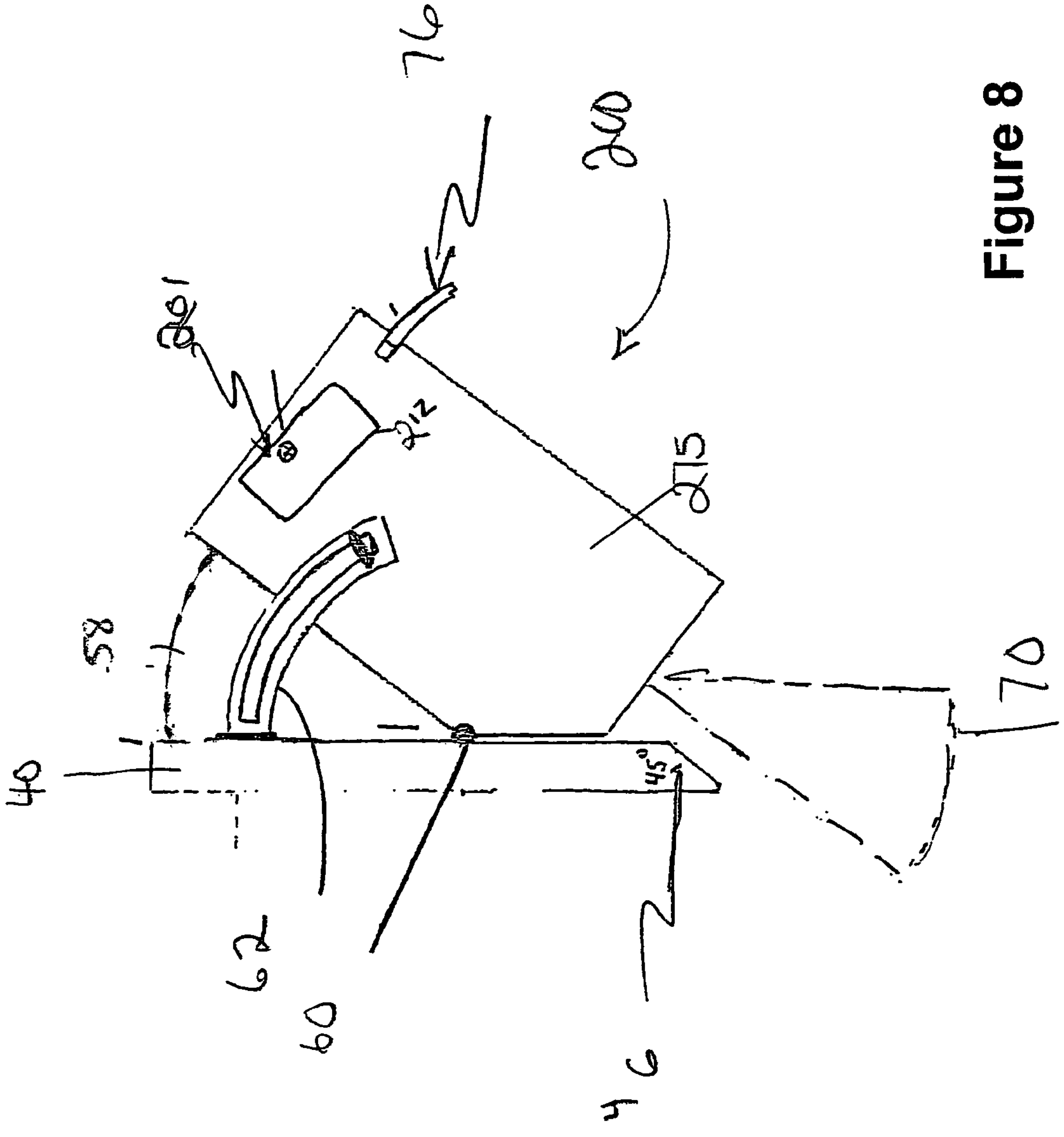
FIG. 8 is a side view, partly in schematic and partly in diagrammatic form, of another embodiment of the scanning module of FIG. 4 including a motion sensor device.
Figure 9B:
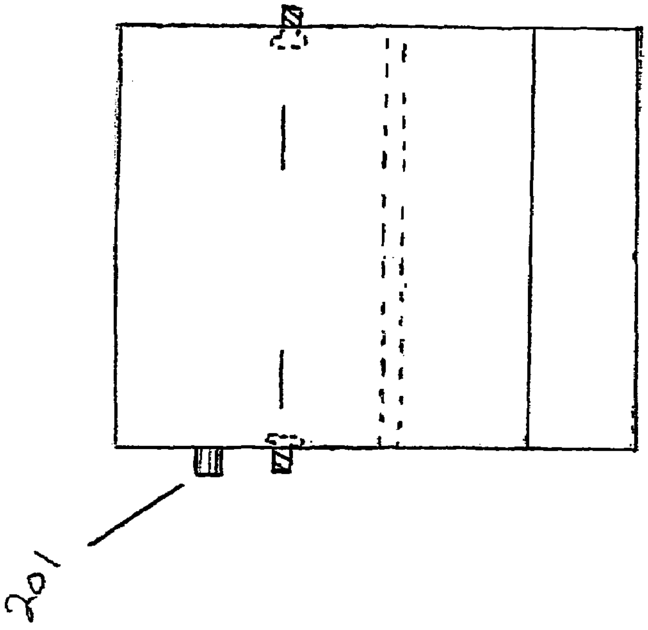
FIGS. 9A and 9B are respectively a side view and a forward view, partly in diagrammatic form, of an embodiment of the scanning module of FIG. 8.
Figure 9A:
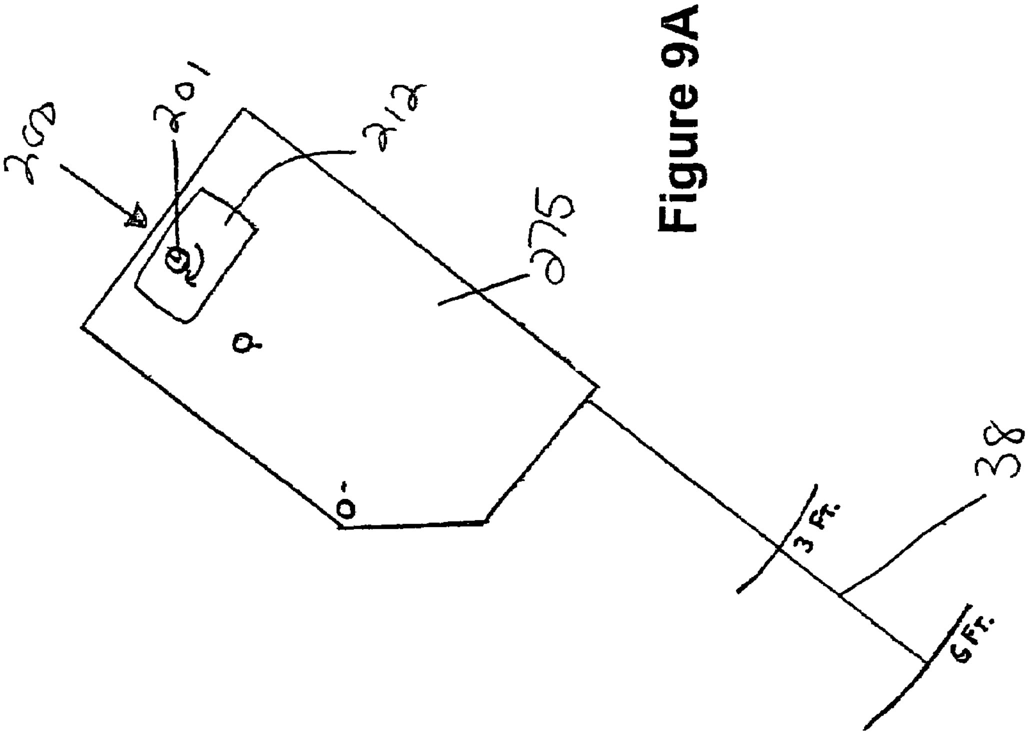

FIG. 8 is illustrative of an embodiment of the scanning module 200 that may incorporate a motion sensor device 212. The sensitivity of the motion sensor device 212 can be adjusted via the adjustment knob 201. The motion sensor device 212 may be radar, sonar, infrared, or other sensing technology chosen in accordance with the desired attributes and location of use. In the embodiment depicted in FIG. 9A the motion sensor device 212 is mounted with or on the scanner body 275. Alternatively, the sensor device 212 can be mounted independent of the scanner body 275.

Scanning modules having a motion sensor device 212 will allow an operator to scan identification and/or location data upon pick-up or drop off of the load without having to independently activate the scanning module. Thus, the motion sensor device 212 will preferably activate the scanning module 200 when the material-handling vehicle approaches pallet or storage location. In one embodiment, the range in which the scanning module 200 becomes activated is about 1-2 feet. Preferably the range in which the scanning module 200 becomes activated is when the forks are about 4 to 10 inches from the pallet. Scanning modules without a motion sensor device may require the operator to depress an activator button every time a scanning task is to be performed.

Figure 10B:
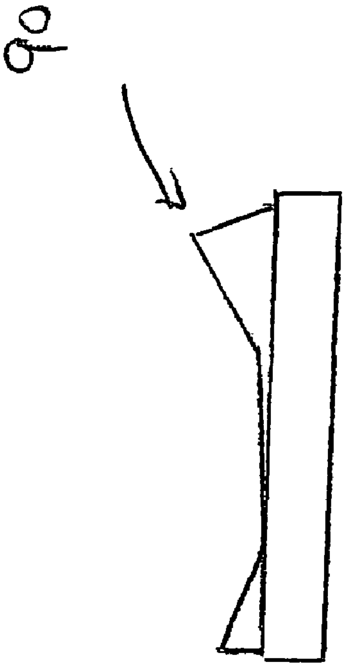
FIGS. 10A and 10B are side views of an embodiment of an activator switch.
Figure 10A:
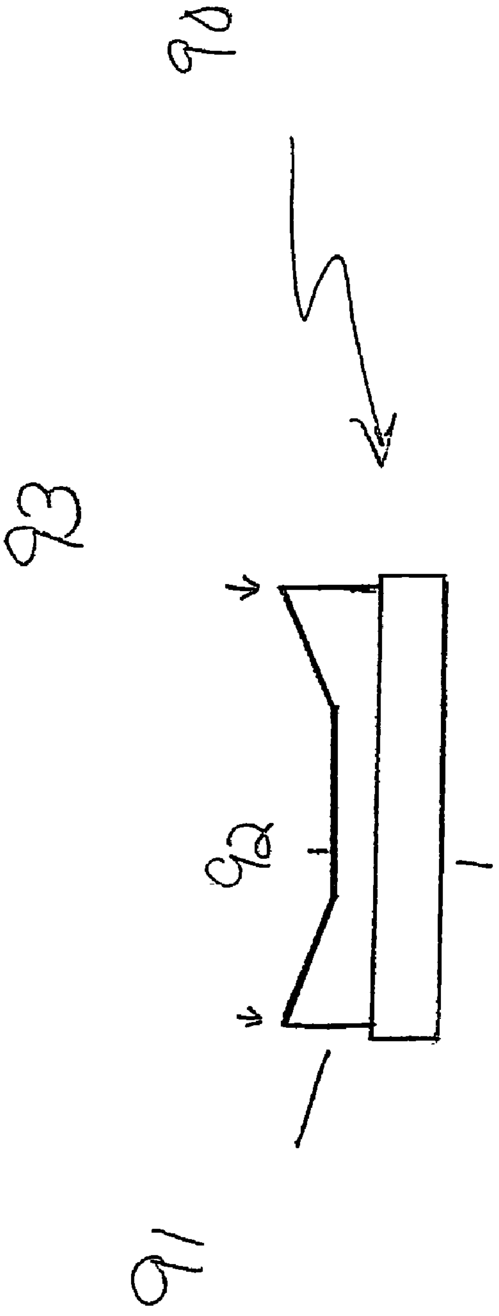

One embodiment of an activator button 90 is illustrated in FIG. 10A. According to this embodiment, depressing one portion 91 of the activator button 90 activates the scanning module 10. Depressing portion 91 may also activate the motion sensor device 212. In the activated mode, the scanning module 10, 100 will scan any identification and/or location data that intersects scan path 38. In one embodiment, identification data will be scanned as the operator enters the pallet 31 to engage the load and storage location data is scanned as the material-handling vehicle backs out of a storage rack location. The activator button 90 will remain in the depressed position as seen in FIG. 10B until the operator deactivates the scanning module by depressing portion 93. Alternatively, the motion sensor device 212 will deactivate the scanning module after a period of inactivity. The activator button 90 may also have a "manual mode" that is selected by depressing portion 93. Upon activation of the "manual mode", the scanning module will be activated for a period of time before a spring or a timer returns the activator button 90 to the off or neutral position 92. The operator can use the manual mode to scan identification and/or location data or to help align the material-handling vehicle for pallet entry.

Figure 11:
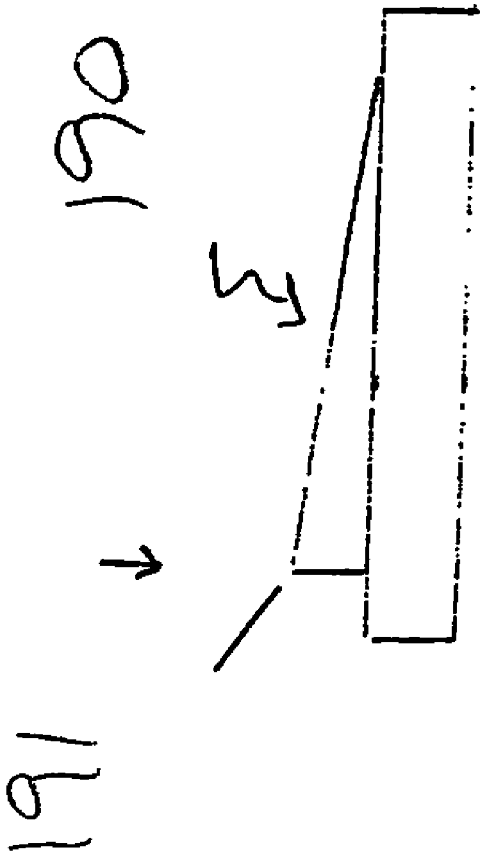
FIG. 11 is a side view of another embodiment of an activator switch.
Figure 12C:
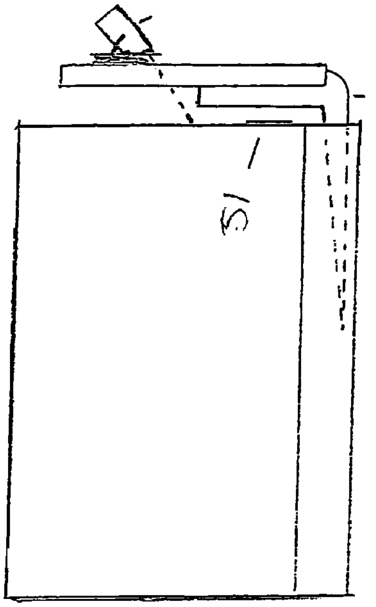
FIGS. 12A-12D are various views, partly in diagrammatic form, of an embodiment illustrating the operation of a scanner module and a load identification and tracking method.
Figure 12D:
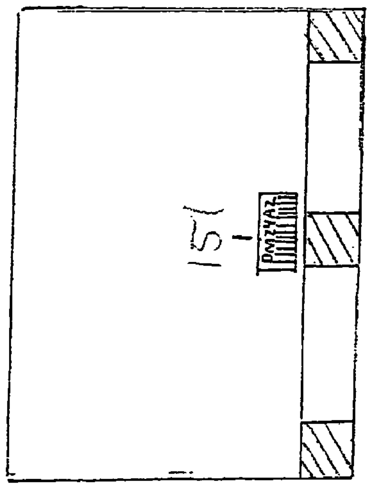
Figure 12A:
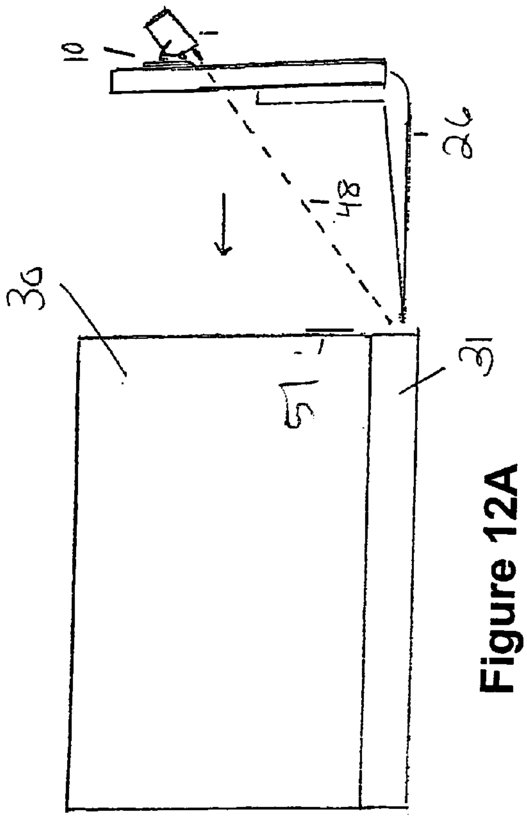
Figure 12B:
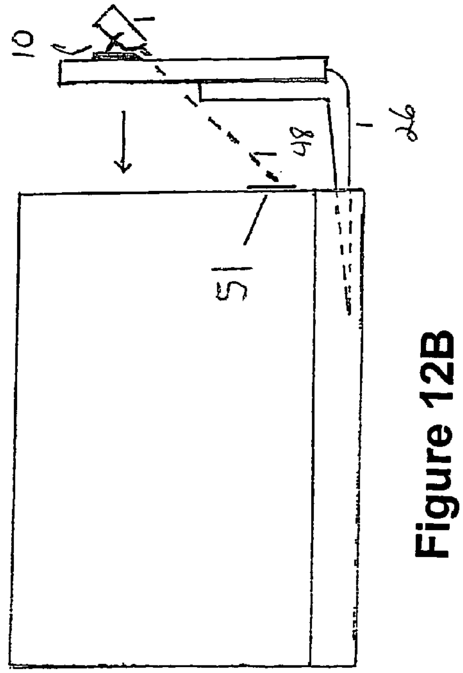

Another embodiment of an activator button 190 is shown in FIG. 11. According to this embodiment, the activator button 190 utilizes a spring mechanism and thus does not remain in a depressed position. Activation of the scanning module is affected by pressing down on portion 191 of the activator button 190. Once activated, the button 190 will remain active for a relatively short period of time and then deactivate scanning module. Preferably the time that button 190 will remain activated is about 15 seconds. Thus, the button 190 will be depressed every time the operator wants to scan identification and/or location data. Alternatively, the operator will depress the button 190 while aligning the vehicle for pallet entry. This embodiment may allow the operator to more efficiently and effectively enter pallets located in high-level storage racks.

Figure 13A:
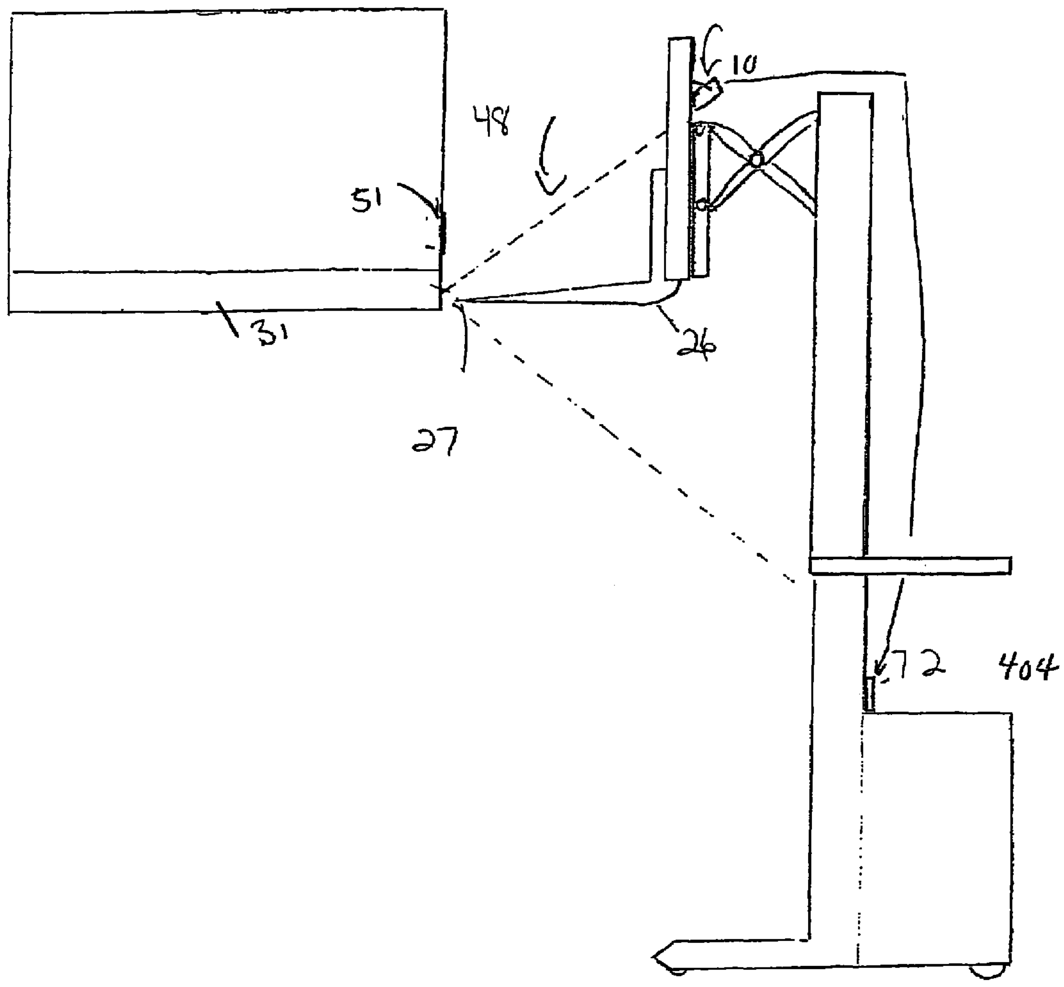
FIG. 13A is a side view, partly in schematic and partly in diagrammatic form, of an embodiment illustrating the operation of the scanner module to align a forklift to engage a pallet in the context of a representative high-level storage system.
Figure 13B:
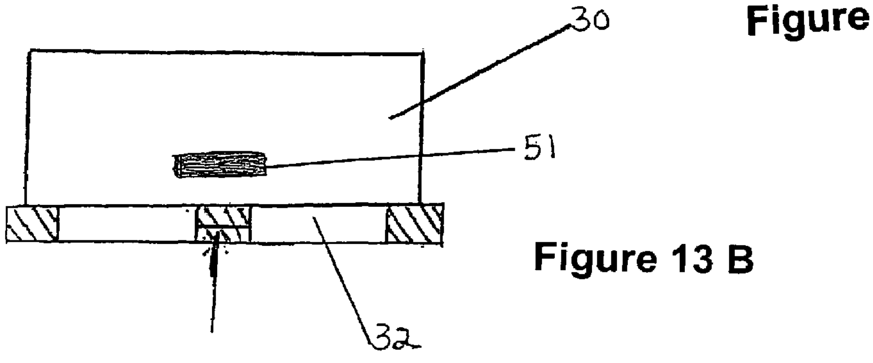
FIG. 13B is an end view of a representative pallet.

A method of using the scanning module and identification system is depicted in FIGS. 12A-12D. In one embodiment, the scanner module 10 is activated as the vehicle approaches the pallet 31. As the vehicle approaches the pallet 31, the operator can see a visible line (light beam) 48 advance across the front of the pallet 31 and the load 30. It is preferable that the operator be able to see the line 48 while steering the vehicle and/or from inside the operator's compartment. The operator uses the line 48 as a visible indicator to guide the fork tips 27 into the pallet channels 32 for pallet entry/engagement as illustrated in FIG. 13B. The visible line 48 originates from a laser inside the scanning module 10. Information gathered from scanning the bar code labels (or other tracking/identification systems) is communicated to the forklift operator via monitor 72 as shown schematically in FIG. 13A.

According to one embodiment of the invention, the scanning module 10, 100, 200 enables the material-handling vehicle operator to more easily track and verify the identity and location of specific pallets and loads. Once aligned with the pallet, the operator enters the pallet 31. Identification and/or location data 51 is scanned when the visible line 48 from the scanning module sweeps over the data. In one embodiment, the identification and/or location data is in the form of a bar code label 151 affixed to the pallet 31. The identification and/or location data may also include other location tracking modalities such as RFID. The ability to scan the data 51 while entering the pallet 31 allows the operator to verify that the correct pallet has been engaged before the load is removed from storage and relocated thus providing a system for real time error checking and inventory storage management.

Figure 14A:
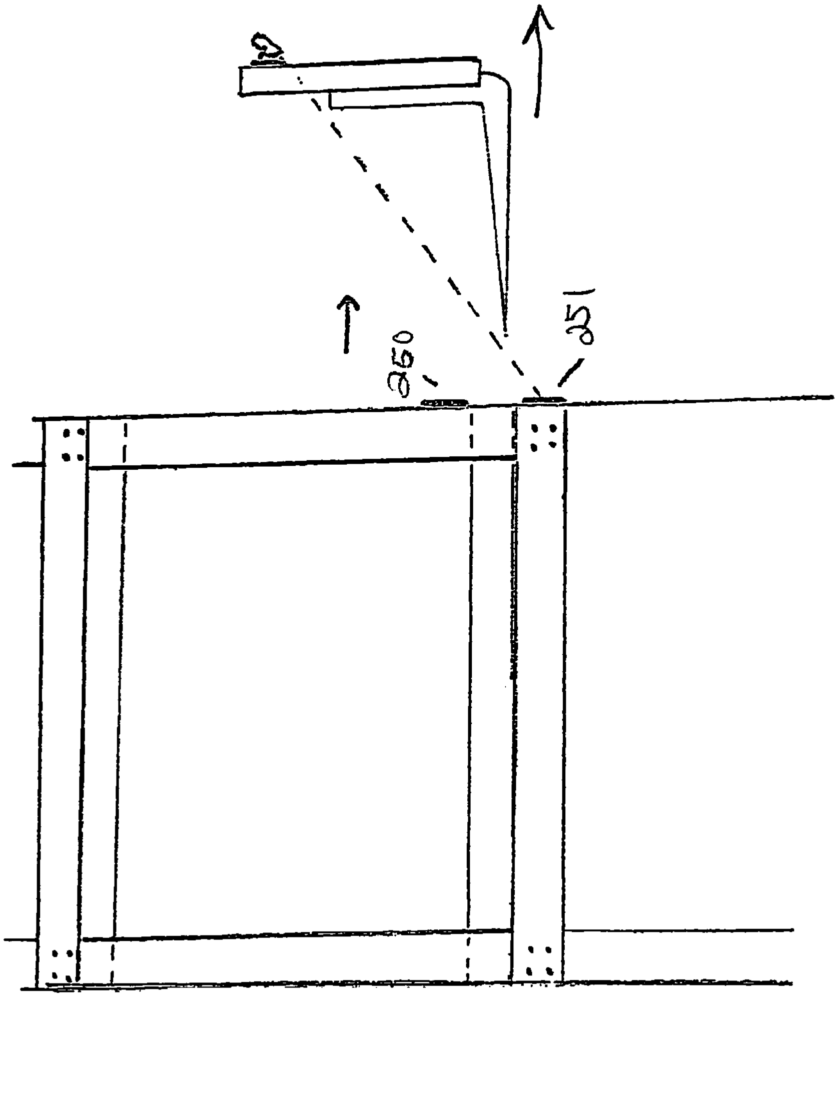
FIGS. 14A and 14B are side views of a forklift, a pallet and a load, illustrating the operation of the scanner device and the load identification method in the context of a high-level storage system.
Figure 14B:
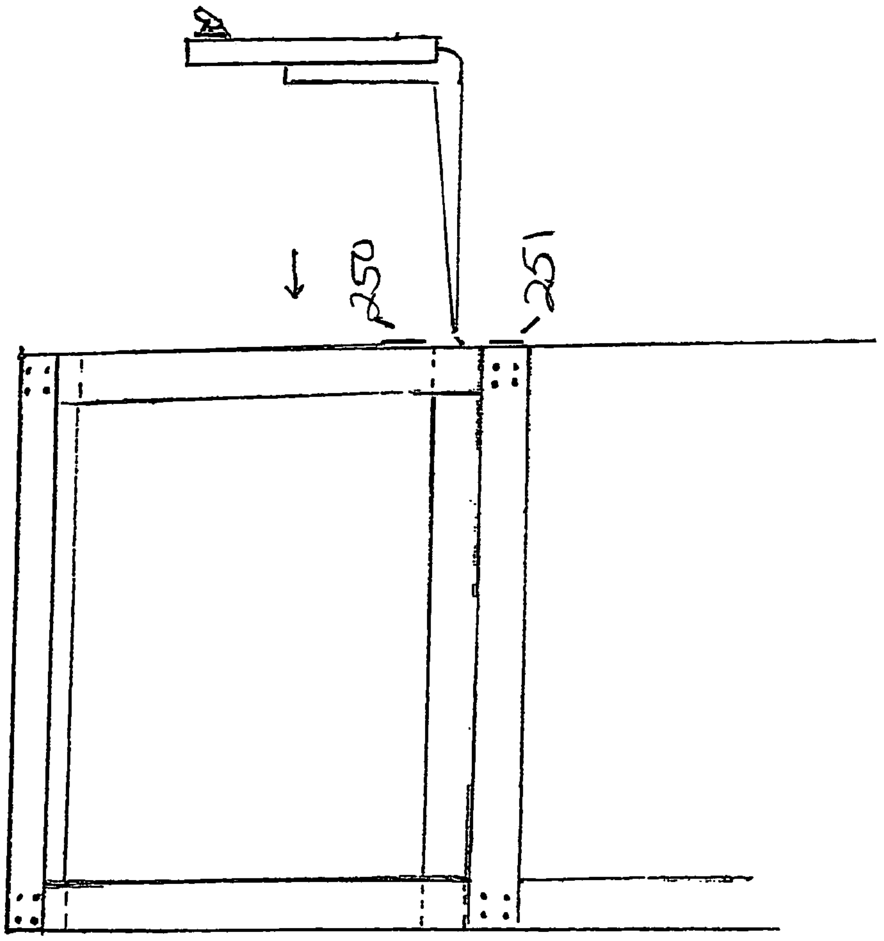

In another embodiment, the scanning module 10, 100, and 200 is used in the context of high-level storage systems as shown in FIGS. 14A-14B. The scanning module and identification system functions as described above, however, the scanning module scans data 251 for identifying a particular location in a high-level storage system and the data 250 for the particular pallet to be engaged and retrieved.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed:

1. A scanner module mounted to a materials-handling vehicle having a vertically displaceable load receiving portion, comprising:

an attachment assembly mounted to the vertically displaceable load receiving portion of said materials-handling vehicle, said attachment assembly including a protective plate having upper and lower ends and rear and forward faces, said rear face facing away from the load and the forward face facing the load;

a scanner unit having a scan mode mounted to said rear face of said protective plate attachment assembly and oriented to generate a scan path forwardly from said attachment assembly below said lower end of said protective plate and whereby said protective plate protects said scanner unit from damage from the load; and an activator which selectively activates the scan mode of said scanner unit.

2. The scanner module of claim 1 further comprising a motion sensor device.

3. The scanner module of claim 2, wherein said scanner module is independently activated by said motion sensor device.

4. The scanner module of claim 3, wherein said scanner module remains activated for a period of about 1 minute.

5. The scanner module of claim 3, wherein said motion sensor device is activated and deactivated by said activator.

6. The scanner module of claim 1, wherein said attachment assembly further comprises:

at least one mounting bracket; and a pivoting pin, wherein said mounting bracket and said pivoting pin define a mounting angle for said scanner unit.

7. The scanner module of claim 6, wherein said protective plate is configured as having an angle at said lower end.

8. The scanner module of claim 7, wherein said angle is about 45 degrees.

9. The scanner module of claim 1, wherein said scanner unit is hard-wired to a monitor inside said material-handling vehicle.

10. The scanner module of claim 6 wherein said bracket provides an adjustable connection between said scanning unit and said mounting plate and said pivot pin pivotally connects said scanner unit to said mounting plate at a point spaced from said bracket so that said scanner unit can be angularly adjusted relative to said mounting plate about said pivot pin.

* * * * *